United States Patent
Patil et al.

(10) Patent No.: US 9,641,597 B2
(45) Date of Patent: May 2, 2017

(54) MANAGING AN APPLICATION ON A COMPUTING SYSTEM

(71) Applicant: TATA CONSULTANCY SERVICES LIMITED, Mumbai, Maharashtra (IN)

(72) Inventors: Sudhakar R. Patil, Lake Zurich, IL (US); Ajay Idnani, Hoffman Estates, IL (US)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 324 days.

(21) Appl. No.: 14/227,437

(22) Filed: Mar. 27, 2014

(65) Prior Publication Data

US 2014/0297710 A1   Oct. 2, 2014

(30) Foreign Application Priority Data

Mar. 28, 2013   (IN) .................... 1238/MUM/2013

(51) Int. Cl.
| | | |
|---|---|---|
| *H04L 29/08* | (2006.01) | |
| *H04W 4/00* | (2009.01) | |
| *H04W 4/02* | (2009.01) | |

(52) U.S. Cl.
CPC ............ *H04L 67/10* (2013.01); *H04W 4/001* (2013.01); *H04W 4/021* (2013.01)

(58) Field of Classification Search
CPC ...................................... H04L 67/10
See application file for complete search history.

(56) References Cited

U.S. PATENT DOCUMENTS

| | | | |
|---|---|---|---|
| 8,341,648 B1* | 12/2012 | Cook ................... | G06F 9/45504 717/168 |
| 8,935,579 B2* | 1/2015 | Jann ......................... | G06F 9/542 714/39 |
| 2006/0047922 A1* | 3/2006 | Johnson ............. | G06F 17/30067 711/156 |
| 2007/0204125 A1* | 8/2007 | Hardy ....................... | G06F 8/62 711/170 |
| 2008/0027959 A1* | 1/2008 | Coha ..................... | H04L 67/125 |
| 2009/0063624 A1 | 3/2009 | Nordstrom et al. | |
| 2011/0202947 A1 | 8/2011 | Gupta et al. | |
| 2012/0221384 A1 | 8/2012 | Avadhanam et al. | |
| 2015/0163288 A1* | 6/2015 | Maes ....................... | H04L 67/10 709/203 |
| 2015/0199197 A1* | 7/2015 | Maes ........................ | G06F 8/71 717/122 |

* cited by examiner

*Primary Examiner* — Lashonda Jacobs
(74) *Attorney, Agent, or Firm* — Drinker Biddle & Reath LLP

(57) ABSTRACT

Systems and methods for managing an application on a computing system are described herein. According to the present subject matter, the system(s) implement the described method(s) for this purpose, where the method(s) include monitoring a user-defined criteria by a managing module for the application. Further, the method includes generating a trigger when a user-defined time-point corresponding to the user-defined criteria is determined. The method also includes performing a user-defined action by the managing module on the application, in response to the trigger generated in accordance with the user-defined criteria. The user-defined includes at least one of an action of deleting the application, an action of moving the application to a location out of the computing system, and an action of de-emphasizing the application.

13 Claims, 2 Drawing Sheets

MANAGING AN APPLICATION ON A COMPUTING SYSTEM

TECHNICAL FIELD

The present subject matter relates to computing systems and, particularly, but not exclusively, to managing an application on a computing system.

BACKGROUND

Computing systems, such as laptops, computers, tablets, and smart phones have become popular and important to daily activities of many users. Nowadays, users are increasingly relying upon the computing systems for performance of a wide-range of personal and work-related tasks. In order to meet the user's requirements, the computing systems have been developed to provide various functionalities, including accessing and displaying websites, sending and receiving e-mails, taking and displaying photographs and videos, playing music and other forms of audio, and etc. These and numerous other functionalities are generally performed by applications provided on the computing systems. Such applications, also referred to as apps, are either pre-installed by a manufacturer of the computing system during its manufacture or downloaded afterwards by the user onto the computing system through various online application stores.

SUMMARY

This summary is provided to introduce concepts related to managing an application on a computing system. This summary is not intended to identify essential features of the claimed subject matter nor is it intended for use in determining or limiting the scope of the claimed subject matter.

In one implementation, system(s) and method(s) for managing an application on a computing system are described. In one implementation, a computing system for managing an application installed on the computing system is described. The computing system includes a managing module having a criteria administration module and an action module. The criteria administration module is configured to monitor a user-defined criteria based on which a user-defined action is configured to be performed for the application, and to generate a trigger when a user-defined time-point corresponding to the user-defined criteria is determined. Further, the action module is configured to perform the user-defined action on the application in response to the trigger generated in accordance with the user-defined criteria.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
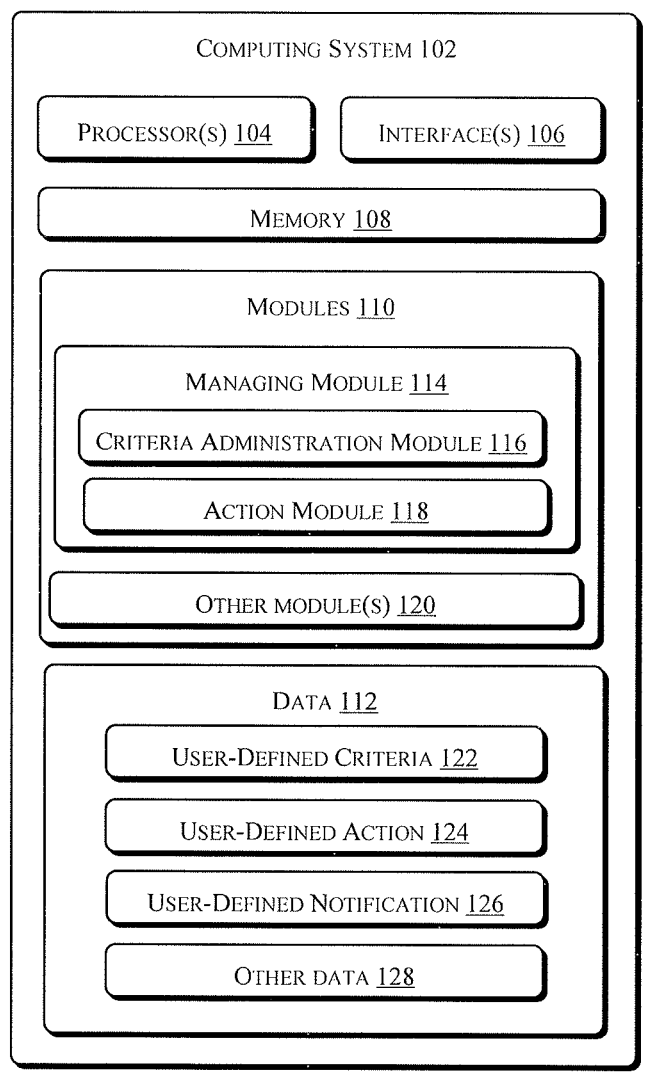
FIG. 1 schematically illustrates a computing system for managing an application, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Systems and methods for managing an application installed on a computing system are described herein. The methods of the present subject matter can be implemented in various hand-held devices with computing and communication capabilities along with multi-tasking functionalities. Although the description herein is with reference to smart-phones, the methods may be implemented in other hand-held devices, albeit with a few variations, as will be understood by a person skilled in the art.

A computing system, for example, a computer, a laptop or other portable devices, such as a tablet computer, a Phablet, a Personal Digital Assistant (PDA) device, and a Smart-phone, is normally able to execute a number of applications for performing various tasks. Such applications, also termed application software, widgets, or "apps", may be either pre-installed by a manufacturer of the computing system during its manufacture or downloaded afterwards by a user onto the computing system. The user may download the applications from various online applications stores, such as the Apple App Store™, Google Play™, Windows Phone Store™, and BlackBerry App World™. The user may add applications in the computing system, for example, to facilitate interaction with websites, to access content from an online account, for messaging, for game play, and for performing many other functions.

Further, owing to the large size memory typically provided in the computing systems, it is common for a user to have more than hundred plus applications installed on the computing system. As will be appreciated, an application typically includes various features that may or not be useful for the user; however, due to the state of the art approach of downloading "all or nothing", the user is required to download the complete application onto the computing system. That is, even if the application contains features that are not desirable to the user, when the application is downloaded onto the computing system, all features of the application are downloaded and added into the memory of the computing system. Further, the more feature-rich an application is, the more likely it is that the application contains features that are not desirable to the user. Such an approach may however cause storage concerns as the undesirable features of the application may consume valuable memory space on the computing system. This may lead to reduction in storage space available for other applications to be downloaded in future.

Thus, in order to free memory space, the user is typically responsible for managing or removing individual applications from the computing system when the user no longer uses or want any application. In such situations, the chances are very high that the user may forget to manage or remove all the unused or unwanted applications. This may lead to an increase in the wastage of premium memory space on the computing system, as the unused or unwanted applications may take away a large portion of the memory, which leaves a small portion of the memory available for future application downloads or other uses. Further, the unused or unwanted application may consume additional computing system resources, such as processors and network ports, for various purposes, such as regular updates which may reduce processing speed of the computing system.

In accordance with the present subject matter, systems and methods are provided to automatically manage an application. According to the present subject matter, a computing system implements a method for managing the application installed on the computing system, where a user may execute the application for performing a task available through the said application. Upon execution of the application for the first time, a managing module implemented inside the application or inside an operating system of the computing system may be activated.

Upon execution, the managing module may facilitate the user to provide a user-defined criteria and a user-defined action corresponding to the user-defined criteria. In one implementation, the user-defined criteria may be understood as a user-defined time-point at which the user-defined action would be performed by the managing module. In an example, the user-defined action may include, but is not limited to, deleting the application, moving the application to a location out of the computing system, and de-emphasizing the application within the computing system.

In one implementation, the managing module may be configured to monitor the user-defined criteria for the application to determine a user-defined time-point at which the user-defined action has to be performed. For example, in case the user-defined criteria relates to usage-based criteria, the managing module may then monitor usage of the application up to a user-defined time-point. In case the application is not used up to the user-defined time-point, a trigger may be generated by the managing module.

Once the trigger is generated, the managing module may automatically perform the user-defined action on the application. For example, the managing module may automatically remove the application from the computing system, in case the user-defined action relates to an action of removing the application once the user-defined criteria are met.

The managing module may thus manage the application, which relieves the user from the burden of manually managing the individual application. In case a number of application installed have not been used at all or for an extended period of time, such applications can be automatically removed. Therefore, automatically removing unwanted or unused applications may create space in memory of the computing system. This in turn may increase the processing speed of the computing system.

The above-mentioned systems and methods are further described in conjunction with the following figures. It should be noted that the description and figures merely illustrate the principles of the present subject matter. Further, various arrangements may be devised that, although not explicitly described or shown herein, embody the principles of the present subject matter and are included within its spirit and scope. Furthermore, all examples recited herein are principally intended expressly to be for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Figure 2:
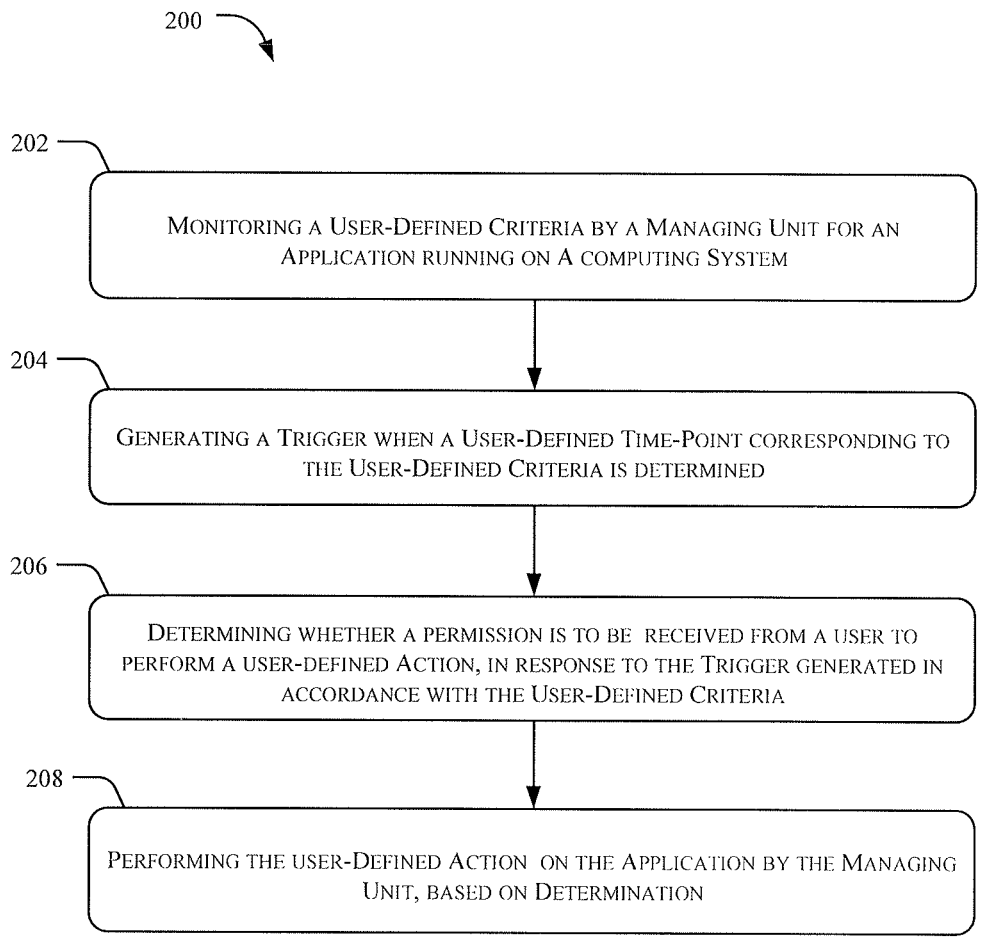
FIG. 2 illustrates a method for managing an application on the computing system, in accordance with an embodiment of the present subject matter.

The manner in which the systems and the methods for managing an application are implemented is explained in detail with respect to FIGS. 1 to 3. While aspects of described systems and methods for data archiving can be implemented in any number of different computing systems, environments, and/or configurations, the embodiments are described in the context of the following system(s).

FIG. 1 illustrates a computing system 102 for managing applications in accordance with an embodiment of the present subject matter. The computing system 102 may include a variety of devices including, but not limited to, computers, laptops or other portable computers, such as tablet computers, Phablets, mobile phones, PDAs, Smart phones, and the like.

Further, in one implementation, the computing system 102 includes processor(s) 104. The processor 104 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in a memory.

Also, the computing system 102 may include interface(s) 106. The interfaces 106 may include a variety of software and hardware interfaces that allow the computing system 102 to interact with different applications and the peripheral hardware components of other computing systems. The interfaces 106 may facilitate multiple communications within a wide variety of protocol types including, operating system to application communication, inter process communication, etc.

In one implementation, the computing system 102 may also include a memory 108. The memory 108 may be coupled to the processor 104. The memory 108 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the computing system 102 may include module(s) 110 and data 112. The modules 110 and the data 112 may be coupled to the processors 104. The modules 110, amongst other things, include routines, programs, objects, components, data structures, etc., which perform particular tasks or implement particular abstract data types. The modules 110 may also be implemented as, signal processor(s), state machine(s), logic circuitries, and/or any other device or component that manipulate signals based on operational instructions.

In one embodiment of the present subject matter, the modules 110 may be computer-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the computer-readable instructions can be also be downloaded to a storage medium via a network connection.

In an implementation, the module(s) 110 include a managing module 114, having a criteria administration module 116 and an action module 118, and other module(s) 120. The other module(s) 120 may include programs or coded instructions that supplement applications or functions performed by the computing system 102. In said implementation, the data 112 includes user-defined criteria 122, user-defined action 124, user-defined notification 126, and other data 128. The other data 128 amongst other things, may serve as a repository for storing data that is processed, received, or generated as a result of the execution of one or more modules in the module(s) 110. Although the data 112 is shown internal to the computing system 102, it may be understood that the data 112 can reside in an external repository (not shown in the figure), which may be coupled to the computing system 102. The computing system 102 may communicate with the external repository through the interface(s) 106 to obtain information from the data 112.

In one implementation, the managing module 114 may be configured to manage an application installed on the computing system 102, also referred to as a software application, widget, or "app", that is installed on the computing system 102. In an example, the application may be installed on the computing system 102 by a manufacturer on the computing system 102 at the time of manufacturing of the computing system 102. In another example, the application may be installed by a service provider when the computing system 102 is marketed by the service provider. In yet another example, the application may be downloaded afterwards by the user onto the computing system 102 through various online application stores, such as the Apple App Store™, Google Play™, Windows Phone Store™, Blackberry App World™, and the like. The application may be downloaded onto the computing system 102 by the user for various purposes, such as entertainment and increasing the functionality of the computing system 102.

Further, in one implementation, the managing module 114 described herein, can be implemented in any computing system, comprising a variety of devices including, but not limited to, hand-held devices, laptops or other portable computers, tablet computers, Phablets, mobile phones, PDAs, Smart phones, and the like. The managing module 114 may interface with multiple applications, running on the computing system, through an operating system of the computing system. In the said implementation, the managing module 114 may be configured to manage a regular application installed on the computing system 102. The regular application may be understood as a software application that may not have the capability to self-manage itself. For the regular application, the managing module 114 can be implemented in the form of a software component that is implemented on an operating system loaded on the computing system 102. The managing module 114 may be implemented on the operating system at the time of designing of the operating system. In the said implementation, the managing module 114 may facilitate the operating system to manage a plurality of regular applications running on the operating system of the computing system 102.

In another implementation, the managing module 114 may be implemented in an application to configure a self-managing application. The self-managing application may be understood as a software application that has the capability to self-manage itself. Like the regular application, the self-managing application may be installed either by a manufacturer, a service provider, or a user. The self-managing application may relieve the user from the burden of manually managing the application.

In operation, the user may launch or execute the application installed on the computing system once the user intends to execute a task associated with the application. Upon execution of the application for the first time, the criteria administration module 116 of the managing module 114 may receive a user-defined criteria and a user-defined action corresponding to the user-defined criteria from the user. The user-defined criteria may be understood as a user-defined time-point at which the user-defined action would be performed by the managing module 114.

In an example, the user may subsequently define a user-defined time-point associated with the user-defined criteria. Examples of the user-defined criteria may include, but is not limited to, time-based criteria, event-based criteria, license-based criteria, usage-based criteria, priority-based criteria, specific-location-based criteria, user-configured criteria, and resource-constraint criteria. For example, in case the user-defined criteria relates to resource-constraint criteria, the criteria administration module 116 may then monitor memory space available up to a time-point at which a reduction of the available memory space on the computing system 102 reaches below a predefined threshold. In another example, in case the user-defined criteria relates to license-based criteria, the managing module 114 may then monitor the application for a time point at which the license expires for the self-managing application. In this example, when time point at which the license expires for the self-managing application, the managing module 114 may generate a trigger.

In one implementation, the user may define different priorities to different user-defined criteria. For example, in case the user-defined criteria is achieved, the managing module 114 may perform the user-defined action on an application that is defined with highest priority. In another implementation, the user may not define any criteria for the application. In such implementation, the criteria administration module 116 may set a default criteria for the application. Further, the criteria administration module 116 may also maintain data relating to the user-defined criteria and the user-defined action that are defined by the user, as the user-defined criteria 122 and the user-defined action 124, respectively.

Further, in one implementation, the user-defined action may include, but is not limited to, deleting the application, moving the application to a location out of computing system, and de-emphasizing the application. In an example, the de-emphasizing of the application may include changing the appearance of the application on computing system's screen. Another way is to change the background color of the application to a color that is less bright than the other applications. For example, applications that are most accessed can be managed to have a less bright background. In such a case, power consumption resulting from the frequent use of such applications is also likely to reduce.

In another implementation, the user-defined action may include an action of notifying and/or prompting the user before the performance of the user-defined action. The notification options defined by the user in the criteria administration module 116 are stored as the user-defined notification 126 in the computing system 102.

In yet another implementation, the user-defined action may not be performed automatically. In such implementation, the managing module 114 may request the user for providing an approval to initiate the user-defined action each time the managing module 114 needs to take the user-defined action.

Thereafter, once the user-defined criteria and the user-defined action are defined by the user, the criteria administration module 116 may monitor the application for the user-defined criteria, and generate a trigger when the user-defined criteria is realized. For example, in case the user-defined criteria relates to resource-constraint criteria, the criteria administration module 116 may then monitor up to a time-point at which a reduction of available memory space on the computing system 102 reaches below a predefined threshold. In said example, when the amount of available memory space falls below the predefined threshold, the criteria administration module 116 may generate a trigger. It will be appreciated by a skilled person that the predefined threshold can be defined either by the user of the computing system 102 or by a manufacturer of the computing system 102.

Once the trigger is generated by the criteria administration module 116, the action module 118 may traverse through the user-defined notification 126 to determine the notification option defined by the user. In an example, in case the user-defined notification 126 indicates that the user has defined a notification option of being notified at the time of performance of the user-defined action, the action module 118 may notify the user regarding the trigger. The user may then either allow or block the performance of the user-defined action. In another example, in case the user-defined notification 126 indicates that the user has not defined a notification option of being notified, the action module 118 may then automatically perform the user-defined action on the application. For example, in case the user-defined action defined by the user relates to deletion of the application, the action module 118 may then remove the application from the memory of the computing system 102 to prevent unused or undesired application from occupying memory space on the computing system 102.

In an example, the user may define a user-defined action to remove an application in case the application is not used for a predefined time period after being installed on the computing system 102. In another example, the user may define a user-defined action to remove an application that is not accessed for a predefined time period. In one implementation, the criteria administration module 116 may be configured to monitor the applications and maintain data relating to the dates and/or times on which an application was last accessed by the user as well as the frequency with which an application has been accessed.

In another example, the managing module 114 at user's discretion may notify an application developer of the application about the user-defined action performed on the unused or undesired application. The application developer may use the said notification as a feedback from the user.

In this way, the managing module 114 may be implemented on a host platform, for example, an operating system, of the computing system 102 to manage applications that may not have the capability to self-manage themselves. This facilitates the operating system to automatically handle unwanted and undesired applications. This may lead to an increase in the processing speed of the computing system 102 on which the operating system having the functionality of managing module 114 is executing.

In addition, the managing module 114 may also be implemented inside applications to make the applications as self-managing applications. The self-managing applications may manage themselves by automatically removing, moving, or hiding themselves when the user-defined criteria for them are triggered. By having self-managing applications, valuable memory space of the computing system 102 is not wasted and additional memory space is made available for future downloads, as the unused or undesired applications are automatically removed from the computing system 102.

In furtherance to that, the application of the managing module 114 can be better understood by way of an example. For example, in case a user has a problem with his/her refrigerator, the user may then look for a support from a manufacturer or a service provider of that refrigerator. For support, the manufacturer or the service provider may offer the user with an application that the user can use to report refrigerator's problem as well as capture picture, audio, video, etc., associated with the refrigerator's problem. Since the user may not be interested in adding yet another application to his/her computing system, the user may avoid the usage of such application and may prefer to talk to someone for reporting the refrigerator's problem. However, in case the manufacturer or the service provider offers the user with a self-managing application that manages itself and that can delete itself after the refrigerator's problem is addressed, then the user may go ahead and download the application. Now, when the user executes the self-managing application for the first time, the self-managing application may give the user with an option to set a trigger. In an example, the user may set the trigger to delete after refrigerator's problem is addressed.

FIG. 2 illustrates a method 200 for managing applications on a computing system, according to an embodiment of the present subject matter. The order in which the method 200 are described is not intended to be construed as a limitation, and any number of the described method blocks can be combined in any order to implement the methods, or any alternative methods. Additionally, individual blocks may be deleted from the method 200 without departing from the spirit and scope of the subject matter described herein. Furthermore, the method 200 can be implemented in any suitable hardware, software, firmware, or combination thereof.

The method 200 may be described in the general context of computer executable instructions. Generally, computer executable instructions can include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the method 200 can be performed by programmed computers and communication systems. Herein, some embodiments are also intended to cover program storage devices, for example, digital data storage media, which are machine or computer readable and encode machine-executable or computer-executable programs of instructions, where said instructions perform some or all of the steps of the described methods. The program storage devices may be, for example, digital memories, magnetic storage media, such as a magnetic disks and magnetic tapes, hard drives, or optically readable digital data storage media. The embodiments are also intended to cover both communication network and communication systems configured to perform said steps of the exemplary methods.

Referring to FIG. 2, a method 200 of managing an application installed on the computing system 102 is described in accordance with the present subject matter.

In step 202, the method 200 may include monitoring of user-defined criteria by a managing module 114 for the application installed on the computing system 102. The user-defined criteria may be understood as a time-point at which an action would be performed by the managing module 114. In an example, the managing module 114 may provide a user with an option to define the user-defined criteria and a user-defined action corresponding to the user-defined criteria. In an example, the user-defined criteria and the user-defined action may be defined when the application is launched for the first time on the computing system 102.

In one implementation, the application may be understood as a software application that may not have the capability to self-manage itself For such application, the managing module 114 can be implemented in the form of a software component that is implemented on an operating system loaded on the computing system 102. In said implementation, the managing module 114 may be implemented on the operating system at the time of designing of the operating system.

In another implementation, the application may be understood as a self-managing application in which the managing module 114 is incorporated.

In step 204, the method 200 may include generating a trigger when the user-defined time-point corresponding to the user-defined criteria is determined. For example, in case the user-defined criteria relates to an event-based criteria relating to a time-point when a service request would be closed, the managing module 114 may then monitor the application for the said time-point at which the said event may occur on the computing system 102. In this example, when the said time-point at which the said event may occur on the computing system 102, the managing module 114 may generate a trigger.

In step 206, the method 200 may include determining whether a permission is to be received from the user for performing a user-defined action, in response to the trigger generated in accordance with the user-defined criteria. In one example, the managing module 114 may also provide the user with an option for being notified and/or prompted before the performance of the user-defined action upon triggering of the user-defined criteria. In another example, the managing module 114 may also allow the user to opt for not allowing the managing module 114 to automatically perform the user-defined action.

In step 208, the method 200 may include performing the user-defined action by the managing module 114 on the application, based on the determination performed in step 206. The action may include, but is not limited to, deletion of the application, moving the application to a location out of computing system's memory, and de-emphasizing the application. In an example, the user-defined action may include an action of removing the application in case the application is not used for a defined period of time after the application is launched for the first time on the computing system 102.

In this way, in one example, the present subject matter may implement the functionality of the managing module 114 on a host platform, for example, an operating system, of the computing system 102 to manage applications that may not have the capability to self-manage themselves. This makes sure that unwanted and undesired applications are automatically handled by the operating system having the functionality of managing module 114. This may lead to an increase in the processing speed of the computing system 102 on which the operating system having the functionality of managing module 114 is executing.

In another example, the present subject matter provides self-managing applications by implementing the managing module 114 in the self-managing applications. The self-managing applications may manage themselves by automatically removing, moving or hiding themselves when the criteria defined for them are triggered. By having self-managing applications, valuable memory space of the computing system 102 is not wasted and additional memory space is made available for future application downloads. Further, by having more free space available on memory, the processing speed of the computing system 102 may also increase.

Although embodiments for methods and systems for managing applications on a computing have been described in a language specific to structural features and/or methods, it is to be understood that the present subject matter is not necessarily limited to the specific features or methods described. Rather, the specific features and methods are disclosed as exemplary embodiments for managing applications on a computing system.

We claim:

1. A computing system for managing an application installed on the computing system, the computing system comprising:
   a processor;
   a managing module coupled to the processor, wherein the managing module comprising:
      a criteria administration module, coupled to the processor, to:
         monitor a user-defined criteria based on which a user-defined action performed on the application, and
         generate a trigger when a user-defined time-point corresponding to the user-defined criteria is determined; and
      an action module, coupled to the processor, to:
         perform the user-defined action on the application in response to the trigger generated in accordance with the user-defined criteria, wherein the user-defined action comprises at least one of an action of deleting the application, an action of moving the application to a location out of the computing system, and an action of de-emphasizing the application, and wherein the user-defined criteria comprises at least one of a time-based criteria, an event-based criteria, license-based criteria, usage-based criteria, priority-based criteria, specific-location-based criteria, a user-configured criteria, and a resource-constraint criteria; and
      a managing module, coupled to the processor, to notify an application developer of the application about the user-defined action performed on the application, wherein the application developer uses the notification as a feedback.

2. The computing system as claimed in claim 1, wherein the criteria administration module, coupled to the processor to receive the user-defined criteria and the action-defined criteria from a user.

3. The computing system as claimed in claim 1, wherein the criteria administration module, coupled to the processor to receive an input from the user to define whether the user has to be notified before the performance of the user-defined action.

4. The computing system as claimed in claim 1, wherein the managing module is implemented in the application that has to be managed.

5. The computing system as claimed in claim 1, wherein the managing module is deployed on the computing system for managing the application.

6. A method for managing an application on a computing system, wherein the method comprising:
   monitoring a user-defined criteria based on which a user-defined action is performed on the application running on the computing system;

generating a trigger when a user-defined time-point corresponding to the user-defined criteria is determined;

performing the user-defined action on the application by the managing module, based on the determination, wherein the user-defined action comprises at least one of an action of deleting the application, an action of moving the application to a location out of the computing system, and an action of de-emphasizing the application, and wherein the user-defined criteria comprises at least one of a time-based criteria, an event-based criteria, license-based criteria, usage-based criteria, priority-based criteria, specific-location-based criteria, a user-configured criteria, and a resource-constraint criteria; and notifying an application developer of the application about the user-defined action performed on the application, wherein the application developer uses the notification as a feedback.

7. The method as claimed in claim 6, the determining comprising notifying a user before performing a user-defined action on the application.

8. The method as claimed in claim 6, wherein the performing comprises automatically performing the user-defined action on the application when the trigger is generated in accordance with the user-defined criteria.

9. The method as claimed in claim 6, wherein the performing comprises receiving approval from the user to initiate the user-defined action on the application.

10. The method as claimed in claim 6, further comprises receiving the user-defined criteria and the user-defined action corresponding to the user-defined criteria from the user.

11. The method as claimed in claim 6, wherein the managing module is implemented in the application that has to be managed.

12. The method as claimed in claim 6, wherein the managing module is deployed on an operating system of the computing system for managing the application.

13. A non-transitory computer-readable medium having a set of computer readable instructions that, when executed, cause a processor to:

monitor a user-defined criteria based on which a user-defined action is performed on the application running on the computing system;

generate a trigger when a user-defined time-point corresponding to the user-defined criteria is determined;

perform a user-defined action on the application by the managing module, in response to the trigger generated in accordance with the user-defined criteria, wherein the user-defined action comprises at least one of an action of deleting the application, an action of moving the application to a location out of the computing system, and an action of de-emphasizing the application, and wherein the user-defined criteria comprises at least one of a time-based criteria, an event-based criteria, license-based criteria, usage-based criteria, priority-based criteria, specific-location-based criteria, a user-configured criteria, and a resource-constraint criteria; and notify an application developer of the application about the user-defined action performed on the application, wherein the application developer uses the notification as a feedback.

* * * * *